Sept. 15, 1931.  R. J. LUSSE  1,823,617
BUMPER CONSTRUCTION
Filed March 26, 1931  2 Sheets-Sheet 1

Inventor:
Robert J. Lusse,
by his Attorneys
Howson & Howson

Sept. 15, 1931.  R. J. LUSSE  1,823,617
BUMPER CONSTRUCTION
Filed March 26, 1931  2 Sheets-Sheet 2
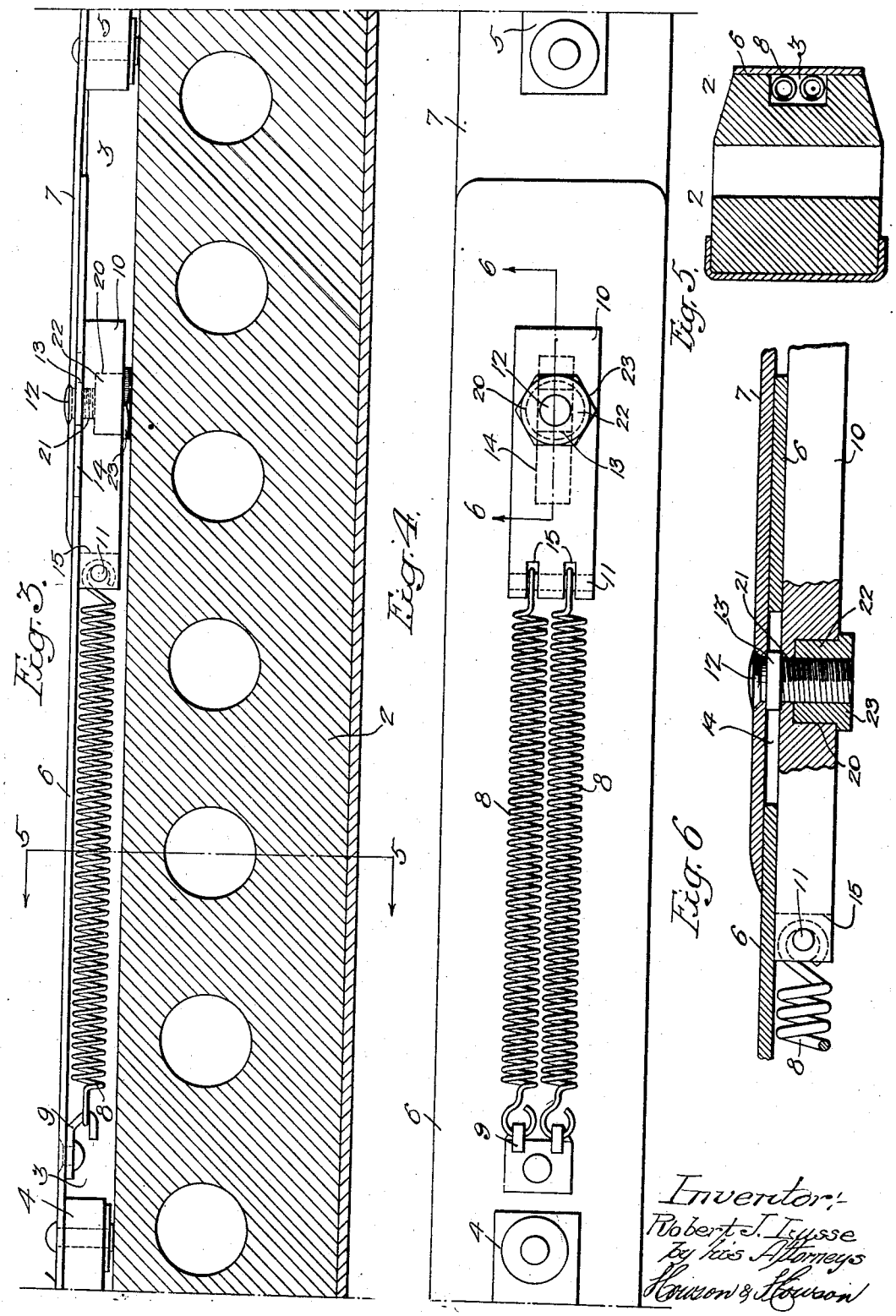

Patented Sept. 15, 1931

1,823,617

UNITED STATES PATENT OFFICE

ROBERT J. LUSSE, OF PHILADELPHIA, PENNSYLVANIA, ASSIGNOR TO LUSSE BROS., INC., OF PHILADELPHIA, PENNSYLVANIA, A CORPORATION OF PENNSYLVANIA

BUMPER CONSTRUCTION

Application filed March 26, 1931. Serial No. 525,482.

This invention relates to new and useful improvements for amusement cars of the type disclosed in United States Letters Patent No. 1,754,112, issued to Robert J. Lusse, under date of April 8, 1930.

Th above mentioned type of amusement car is provided with a rubber bumper which encircles the body of the car for the purpose of absorbing shocks caused by collision between cars or other obstacles. Damage to the rubber, as a result of such collision, is prevented by a steel band that is disposed on and extends completely around the outer face of the rubber bumper. The steel band is held in place on the rubber bumper by a leather or other flexible strip which is secured to the steel band and adapted to fit in a groove provided therefor in the outer face of the rubber bumper. It frequently happens that contraction of the rubber, as produced by a collision of the car with a fixed or movable body, causes the guard band to bulge with respect to the rubber bumper, with the result that the flexible retaining strip attached thereto is dislodged from its supporting groove in the rubber bumper.

The object of my present invention is to prevent bulging of the guard band under the circumstances noted, by providing a guard band that is composed of two relatively movable sections which are of such lengths respectively that their adjacent ends overlap, and providing resilient means extending between the sections to take up any slack that may occur in either section of the guard band, thereby maintaining the flexible retaining strip at all times in the supporting groove provided therefor in the outer face of the rubber bumper.

In the accompanying drawings:

Fig. 3 is a sectional view taken on the line 3—3, of Fig. 2;

Fig. 4 is an inside elevation of the protective band shown in Fig. 3, the rubber bumper being removed;

Fig. 5 is a sectional view taken on the line 5—5, Fig. 3; and

Fig. 6 is a sectional view taken on the line 6—6, Fig. 4.

Figure 1:
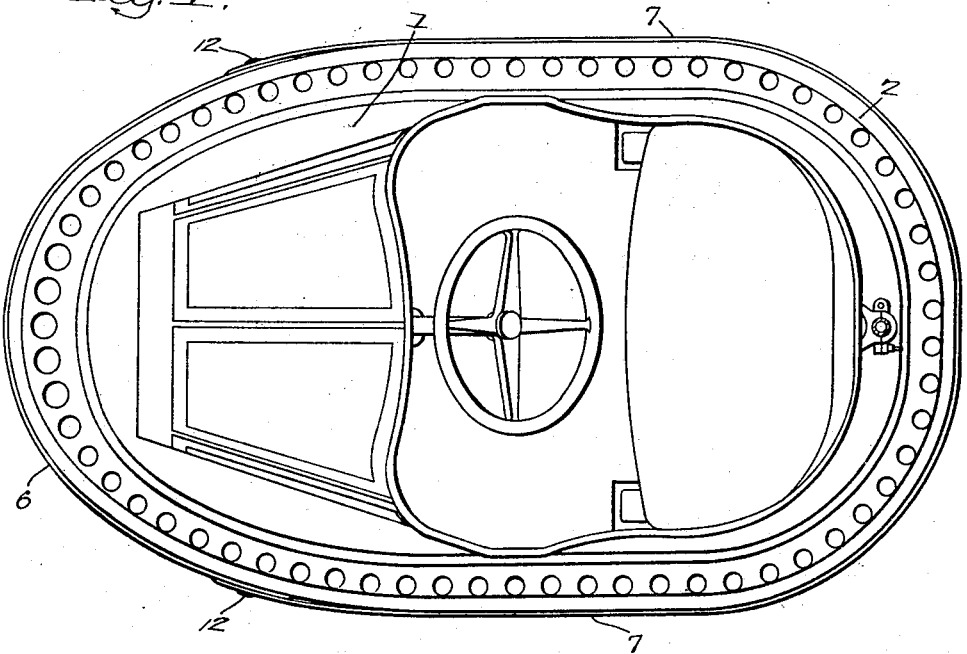
Fig. 1 is a plan view of an amusement car of the type noted and showing mechanism made in accordance with the present invention as applied to the rubber bumper thereof.
Figure 2:
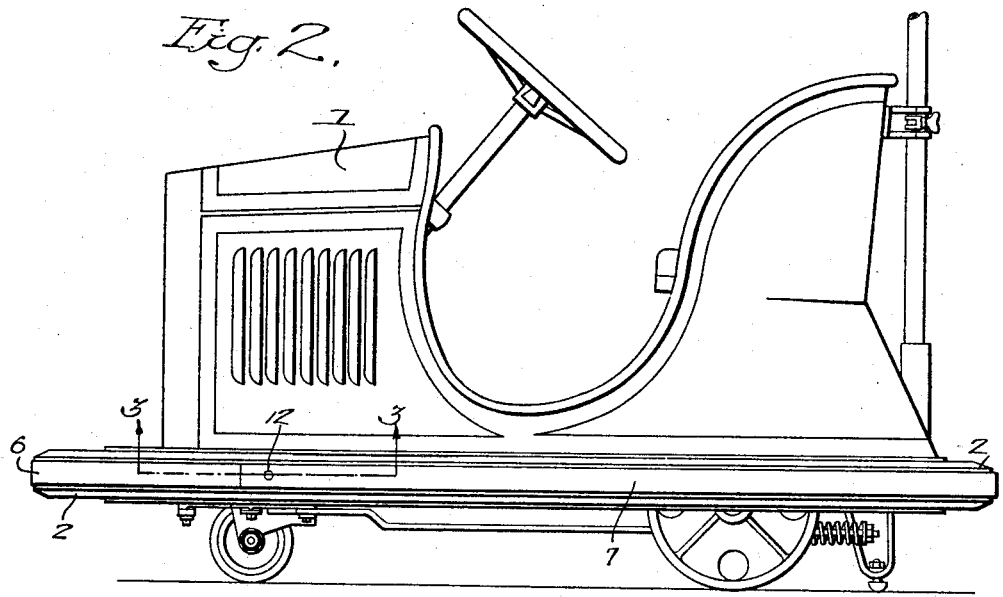
Fig. 2 is a side elevation of the car shown in Fig. 1.

Referring to the drawings, 1 is an amusement car having a rubber bumper 2 encircling the car and attached thereto in the manner illustrated in Figs. 1 and 2 of the drawings. A groove 3 is provided in the outer face of the rubber bumper 2 and extending longitudinally thereof. The groove 3 is adapted to receive leather or other flexible strips 4 and 5 which are secured to the inner faces of the forward and rear guard band sections 6 and 7 respectively.

The aforementioned flexible strips 4 and 5 are of such relative lengths and their combined lengths are such, with respect to the circumferential measurement of the base of the groove 3, that a space is provided intermediate the opposing ends of the strips 4 and 5 in the groove 3, on each side of the car, thereby allowing for relative movement between the opposing ends of the strips 4 and 5, in order that any slack occurring in the band sections 6 and 7 may be taken up, and also providing a recess for the reception of the take-up means.

The take-up means in the present instance comprises coiled springs, or similarly resilient elements, 8, 8. The forward ends of springs 8 are attached to hooks 9 respectively riveted to the guard band section 6, while the rear ends of springs 8 are attached to one end of a steel block 10, which is slidably mounted in and with respect to the groove 3 in the rubber bumper 2. The said rear ends of the springs 8, 8 are disposed in slots 15, 15 formed in the said end of the block 10 and a pin 11 passes through the block, the slots and the ends of the springs 8 disposed in the slots to secure the ends of the springs to the block.

The blocks 10 are rigidly attached to the opposite ends of the guard band section 7 each by a stud bolt 12 that is riveted in the band section 7 and which passes through an elongated slot 14 formed in the adjacent overlapping end of the band section 6. A spacer element 13 is mounted on the stud 12 and is adapted to slide in the slot 14, formed in guard band section 6, said guard band section 6 being slidably interposed between the aforementioned block 10 and the guard band section 7, said spacers 13 being adapted to maintain the blocks and ends of the guard band 7 in such spaced relation as to permit free longitudinal movement of the ends of the guard band 6 therebetween.

The construction of the bumper is such that there is a constant tightening or foreshortening force exerted on the guard band sections 6 and 7, thereby preventing any slack or bulging from developing in the guard band. The springs 8 are adapted to effect a relative longitudinal movement between the overlapping ends of the guard band sections 6 and 7, so that when the car contacts with a fixed abutment or some other movable body, causing a compression of the rubber bumper 2, the leather strips 4 and 5 on the band sections 6 and 7 will be maintained within the supporting groove 3 in the bumper 2, so that the guard band will at no time be dislodged from the rubber bumper 2.

The blocks 10 are respectively provided with circular cavities 20, in axial alignment with the openings 21 through which the bolts 12 pass, for the reception of circular nuts 22 having hexagonal heads 23, by means of which the ends of the guard band section 7, the spacers 13 and the blocks 10 are held rigidly in proper relation to each other to permit the ends of the band section 6 to slide between the blocks 10 and the adjacent ends of the band section 7.

While I have shown the embodiment of my invention for the purpose of description, it is apparent that various changes and modifications may be made therein without departing from the spirit of my invention.

I claim:

1. In a device of the type described, the combination of a resilient bumper, a guard band carried by the bumper, and tension means for preventing slack in the band.

2. In a device of the type described, the combination of a resilient bumper, a split guard band carried by the bumper, and tension means tending to draw the ends of said band toward each other for preventing slack in the band.

3. In a device of the type described, the combination of a resilient bumper, a split guard band carried by said bumper and having its ends disposed in overlapping relation to each other, and tension means connected to said overlapping ends to prevent slack in the band.

4. In a device of the type described, the combination of a rubber bumper, a guard band carried by the bumper, and tension means secured to said band at spaced points therein, adapted to prevent slack in the band.

5. In a device of the type described, the combination of a rubber bumper, a guard band for said bumper comprising a plurality of sections, and tension means operatively connecting adjacent ends of the band sections to prevent slack in said guard band.

6. In a device of the type described, the combination of a rubber bumper having a longitudinal groove formed therein, a guard band, a supporting strip attached to said guard band and located in the said groove, and tension means tending to shorten said band to retain said supporting strip in said groove.

7. In a device of the type described, the combination of a rubber bumper having a longitudinal groove therein, a guard band comprising a plurality of sections, supporting strips attached to said guard band sections and adapted to be maintained in aforementioned groove, and tension means operatively connecting adjacent ends of said band sections to prevent slack in said guard band whereby the supporting strips are maintained in the groove.

8. In a device of the type described, the combination of a rubber bumper, a guard band comprising a plurality of sections having their ends overlapping, and springs connecting the ends of adjacent band sections and adapted to afford a relative longitudinal movement between the overlapping ends of said guard band sections.

9. In a device of the type described, the combination of a rubber bumper having a longitudinal groove therein, a guard band comprising a plurality of sections having their ends overlapping, supporting strips attached to said guard band sections and disposed in said groove, and springs disposed in said groove intermediate the ends of the strips and adapted to afford a relative longitudinal movement between the overlapping ends of the said sections of the guard band.

10. In a device of the type described, the combination of a rubber bumper, a guard band section having slots formed respectively in the opposite ends thereof, a second guard band section disposed with its ends overlapping the ends of the first said section, a block attached to each of the opposite ends of second said guard band section, and spaced therefrom in a manner to receive the ends of the first said section therebetween, and means passing through the slots in the ends of the first said section to secure the blocks to the ends of the second said section.

11. In a device of the type described, the combination of a rubber bumper having a longitudinal groove therein, of a forward guard band having slots in the respective ends thereof, a rear guard band, supporting strips on the guard bands disposed in the groove in the bumper, said guard bands having their ends overlapping, a block attached to each of the opposite ends of said rear guard band and disposed within the groove in the bumper, said blocks and the adjacent ends of rear guard band being spaced apart to receive the respective ends of the forward guard band therebetween, bolts passing through the slots in the ends of the forward guard band for securing the blocks to the ends of the rear guard band, and springs stretched between and connecting the ends of the front band with the blocks on the rear band.

12. In a device of the type described, the combination of a rubber bumper having a longitudinal groove therein, of a forward guard band having slots in the respective ends thereof, a rear guard band, supporting strips on the guard bands disposed in the groove in the bumper, said guard bands having their ends overlapping, a block attached to each of the opposite ends of said rear guard band and disposed within the groove in the bumper, said blocks and the adjacent ends of rear guard band being spaced apart to receive the respective ends of the forward guard band therebetween, bolts passing through the slots in the ends of the forward guard band for securing the blocks to the ends of the rear guard band, spacers between the blocks and the ends of the rear guard band and adapted to slide within the slots in the forward guard band, and springs stretched between and connecting the ends of the front band with the blocks on the rear band.

ROBERT J. LUSSE.